Patented July 1, 1941

2,247,940

UNITED STATES PATENT OFFICE 2,247,940

COLOR STABLE DI-NAPHTHYL METHANE RESIN

William H. Carmody, Pittsburgh, Pa., assignor to The Neville Company, Pittsburgh, Pa., a corporation of Pennsylvania No Drawing. Application May 21, 1938, Serial No. 209,367

6 Claims. (Cl. 260—67)

This invention relates to the control of after-discoloration of resins produced from naphthalene.

As is known, resins may be produced by the condensation of naphthalene with aldehydes. According to one procedure the condensation is effected with formaldehyde in the presence of a suitable catalyst, usually sulfuric acid, to produce what is termed a dinaphthylmethane resin. Whether or not dinaphthylmethane is formed, experience has shown that these resins produced from naphthalene and aldehyde tend to become yellow and discolored from aging, especially in the presence of oxygen, and that this after-discoloration, or after-yellowing, is accelerated by actinic influences, such as sunlight or ultraviolet rays. This after-yellowing is disadvantageous because it militates against the use of such resins where permanency of color is necessary. For instance, such a resin can not be used for the production of clear films where it is essential or desirable that there be no change in color, nor can it be used in clear varnish compositions, or in paints, varnishes and similar coating compositions carrying white or light-colored pigments. Likewise, this phenomenon militates against the use of these resins for or with clear or light-colored molding compositions. As far as I am aware it has not been possible prior to my invention to control this after-yellowing capability of these resins.

A major object of the invention is to provide control of the after-yellowing capability of naphthalene-aldehyde resins, especially those made from naphthalene and formaldehyde, by a method which is simple, easily practiced with standard apparatus and materials, does not unduly increase the cost of the resins, and permits the production of resin of substantially non-yellowing capability.

The invention is predicated upon my discovery that its stated objects are attained by hydrogenation of the resin, particularly in solution, in the presence of a hydrogenation catalyst. In this manner the after-yellowing potentiality of the resin is substantially reduced or eliminated, at least from commercial standpoints, according to the extent of the hydrogenation.

In the practice of the invention the resin is first dissolved in a solvent. The hydrogenation of the resin in solution is desirable because for reasons of economy it is desirable to hydrogenate at elevated temperatures. On the other hand, if the temperature is elevated sufficiently there is a tendency for resins generally to undergo various degenerative influences, such as cracking, depolymerization, and other undesired consequences. Through hydrogenation in solution, however, the heat stability, i. e., the minimizing of degenerative changes, is improved, and particularly is this important with resins of very high molecular weight.

For most purposes it is advantageous to use a solvent which is inert, or substantially so, toward hydrogenation, to insure hydrogen economy, and because control of hydrogenation is thereby simplified. Also, for most purposes, it is desirable, for the same reasons, that the solution be substantially free from other substances capable of hydrogenation, at least to any substantial extent.

Various hydrogenation catalysts are known but I prefer to use the metallic hydrogenation catalysts, of which a number are known and used. Of this latter class good results are had with catalytic nickel. Of the nickel catalysts I have found that the so-called "Raney" catalyst affords a suitable one for the practice of this invention. This catalyst is prepared by adding finely divided nickel-aluminum alloy to an aqueous solution of an alkali, whereby the aluminum is dissolved, leaving metallic nickel in highly porous and highly active condition. The alloy may be ground to, say, 200 mesh, and for most purposes the use of a 10 per cent solution of sodium hydroxide is satisfactory. After the reaction has ended the nickel is separated from the alkali solution and is washed repeatedly with water to free it from residual impurities. It is then transferred, without undue exposure to the atmosphere, to a hydrocarbon liquid from which residual water may be boiled. As thus suspended in the hydrocarbon liquid it is added in desired proportion to the solution to be hydrogenated.

In general, it is desirable to operate at temperatures and pressures above atmospheric because under atmospheric conditions the hydrogenation ordinarily proceeds so slowly as to be uneconomical for commercial purposes. As far as I have been able to determine, however, the effect of increased temperature is that normally to be expected, namely, a simple increase in rate of reaction. The upper temperature limit is fixed, of course, by the temperature at which degenerative changes, such as depolymerization, cracking, splitting of hydrogen, and the like, occur in the resin. Within this range any temperature may be chosen which affords a rate of reaction providing desired economy, due consideration being had to other factors such as time of operation, hydrogen pressure, and the like. Similarly, an increase in pressure appears primarily to effect an increase in the rate of reaction and shift in equilibrium point, as will be understood by those skilled in the art.

Although for many purposes it will be desirable to effect hydrogenation to an extent such as to render the hydrogenated resin completely non-yellowing, or virtually so, it will be understood that for some purposes a substantial reduction of the after-yellowing potentiality suffices, and to this end the temperature, pressure and time of operation may be so correlated as to effect hydrogenation to an extent productive of the desired resistance to after-yellowing. That is, for some purposes after-yellowing to some extent may be permissible, and in such instances complete elimination of the after-yellowing capability is unnecessary, for which reason the hydrogenation need be conducted only to destroy the color-forming structure to the extent necessary to provide such resistance.

As exemplifying the practice of the invention, in one test 100 grams of dinaphthylmethane resin were placed in a steel hydrogenating bomb together with 200 cc. of cyclohexane and 50 grams of Raney nickel catalyst. The bomb was flushed out with hydrogen to eliminate residual air, following which it was closed and charged with hydrogen to a pressure of 1070 lbs. It was then progressively heated during one-half hour to about 190° C., during which time the absorption of hydrogen by the resin so exceeded the rate of expansion of the gas and solvent vapor that the pressure in the bomb had fallen to 380 lbs. Hydrogen was recharged to bring the pressure in the bomb up to 1090 lbs., and in the next fifteen minutes the temperature was raised to 195° C., the pressure dropping to 580 lbs. The bomb was again recharged to a pressure of 1090 lbs., for further hydrogenation. At the end of nine hours the bomb was cool, and at a temperature of 40° C. the residual pressure was 460 lbs.

The solution was filtered to separate the nickel, and the solvent was distilled from the filtrate, thus recovering the resin. Films of the hydrogenated resin were then exposed to the radiation from a quartz tube mercury vapor lamp for a period of five hours. Such an exposure to ultraviolet light has been found generally to exhaust the yellowing potentiality of resin. At the end of that exposure the films did not show any development of yellow color, thus demonstrating the effectiveness of the invention in eliminating the after-yellowing potentiality of these resins.

In the test just described the resin absorbed an amount of hydrogen equivalent to the volume required to saturate eight of the double bonds present in the naphthalene molecules, wherefore the saturation was approximately 80 per cent of that possible. This shows that complete saturation of the molecule is unnecessary for the purposes of the invention, and, as indicated hereinabove, saturation to a lesser degree is possible while still attaining the benefits of the invention through elimination or repression of the after-yellowing tendency of these resins.

While the exact reasons why these resins after-yellow, and why hydrogenation eliminates after-yellowing, are not known, I now believe that they are explainable on the basis of the following structural formula:

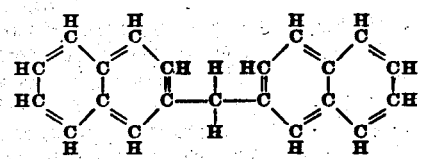

It will be observed from the foregoing formula that the methylene carbon atom is intermediate a pair of double bonds. The hydrogen atoms of the methylene group probably represent the most reactive portion of this molecule, and the reaction of the dinaphthylmethane with, for instance, a ketone may be represented as follows:

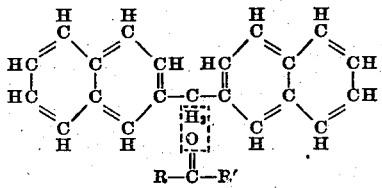

On this assumption it will be observed that the reaction product contains a linkage, represented by the following Formula I, which is closely related to that of the intensely colored fulvenes, indicated generally by the following Formula II:

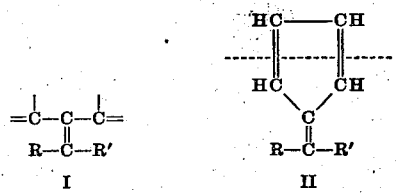

Also, the linkage involved in the reaction of the resin is of the =C—C—C= type which because of its symmetry of unsaturation tends to act as a chromophore with production of colored bodies upon reaction at such linkage. It would be expected upon one or another of these grounds, therefore, that reaction at the methylene carbon atom would produce colored bodies, and upon this basis after-yellowing is reasonably explained. The same type of reaction with the same effect would result with aldehydes.

Such ketonic or aldehydic reagents may be formed in the resin itself through oxidation of the molecule by oxygen, for instance of the atmosphere, under the influence of actinic light, which would then be influenced to react with unoxidized molecules in the manner just postulated, and with consequent after-yellowing. These reactions would take place slowly and progressively in the solid resin, which explains the slow and progressively in the solid resin, which explains the slow and progressively increased discoloration upon aging of these resins.

Similarly, the effect of hydrogenation in repressing or eliminating after-yellowing is explainable on the same basis because if one or both of the double bonds which flank the methylene carbon be saturated, the chromophoric power of this linkage is destroyed in accordance with known principles.

Whether or not the foregoing explanation is correct, and I do not bind myself thereby, the fact is that through hydrogenation in accordance with the invention these resins may be converted to non-yellowing form.

According to the provisions of the patent statutes I have explained the principle and manner of practicing my invention, and have described what I now consider to represent its best embodiment. However, I desire to have it understood that, within the scope of the appended claims, the invention may be practiced otherwise than as specifically described.

I claim:

1. That method of controlling after-yellowing in a resin produced by condensation of naphthalene and an aldehyde that is normally subject to after-yellowing which comprises providing a solution of such resin, adding to the solution a hydrogenation catalyst, and subjecting the mixed solution and catalyst to hydrogenation with gaseous hydrogen at a temperature below that causing degeneration of the resin molecule to effect hydrogenation of the resin destructive of its after-yellowing capability.

2. A method according to claim 1, said catalyst being metallic nickel hydrogenation catalyst.

3. That method of controlling after-yellowing in a resin produced by condensation of naphthalene and an aldehyde that is normally subject to after-yellowing which comprises providing a solution of such resin in a solvent inert to hydrogenation and substantially free from other substances capable of substantial hydrogenation, adding to the solution metallic nickel hydrogenation catalyst, and subjecting the mixed solution and catalyst to hydrogenation with gaseous hydrogen at a temperature below that causing degeneration of the resin molecule to effect hydrogenation of the resin destructive of its after-yellowing capability.

4. That method of controlling after-yellowing in a resin produced by condensation of naphthalene and an aldehyde that is normally subject to after-yellowing which comprises providing a solution of such resin in a solvent inert to hydrogenation and substantially free from other substances capable of substantial hydrogenation, adding metallic nickel hydrogenation catalyst to said solution, and subjecting the mixed solution and catalyst to hydrogenation with gaseous hydrogen at a temperature substantially above atmospheric but below that causing degeneration of the resin molecule to effect hydrogenation of the resin destructive of its after-yellowing capability.

5. A method according to claim 4, said hydrogenation being effected at about 195° C.

6. That method of controlling after-yellowing in a resin produced by condensation of naphthalene and an aldehyde that is normally subject to after-yellowing which comprises subjecting the resin to hydrogenation with gaseous hydrogen in the presence of metallic nickel hydrogenation catalyst at a temperature below that productive of degeneration of the resin molecule.

WILLIAM H. CARMODY.